United States Patent [19]

Ono et al.

[11] Patent Number: 4,595,333

[45] Date of Patent: Jun. 17, 1986

[54] HAND APPARATUS OF A ROBOT

[75] Inventors: Takashi Ono, Chigasaki; Kazuhiko Otsubo, Yamato, both of Japan

[73] Assignee: Kabushiki Kaisha Komatsu Seisakusho, Tokyo, Japan

[21] Appl. No.: 527,271

[22] Filed: Aug. 29, 1983

[51] Int. Cl.⁴ .............................................. B25J 15/00
[52] U.S. Cl. ....................................... 414/729; 901/31; 901/45; 294/88; 294/97; 294/106; 294/902
[58] Field of Search .................. 294/86 R, 88, 106, 97, 294/902; 901/31, 45; 414/4, 729, 730, 783

[56] References Cited

U.S. PATENT DOCUMENTS

| 3,370,452 | 2/1968 | Sack et al. | 901/31 X |
| 4,305,692 | 12/1981 | Brauer | 414/783 X |
| 4,344,734 | 8/1982 | Shumaker | 414/917 X |
| 4,456,293 | 6/1984 | Panissidi | 294/88 X |

FOREIGN PATENT DOCUMENTS 1478911 7/1969 Fed. Rep. of Germany ... 901/31 X
669435 10/1964 Italy .................................. 901/31 X Primary Examiner—Terrance L. Siemens
Attorney, Agent, or Firm—Armstrong, Nikaido, Marmelstein & Kubovcik

[57] ABSTRACT

A hand apparatus of a robot which is less likely to be damaged and can offer a reliable and effective gripping of a workpiece. The hand apparatus comprises a main frame which is mounted to a wrist member through a plurality of damper couplings. Pivotally mounted to the main frame are a pair of four-point-articulated link arms each having two arms extending parallel to each other. A sub-frame having a finger mounted thereon for pivotal movement in every direction is pivotally mounted to the leading end of the respective link arms. A pair of hydraulic cylinders are provided for moving the link arms in a gripping operation.

4 Claims, 14 Drawing Figures

HAND APPARATUS OF A ROBOT

BACKGROUND OF THE INVENTION

This invention relates to hand means for robots.

When the hand means of a robot grips a workpiece which rests on an oscillating bed, the inertia of the workpiece exerts a great force onto the hand means thus damaging the latter. Further, the workpiece placed on the oscillating bed is not limited to a particular shape, but has various shapes, and therefore as the case may be, the hand means of the robot grips either the outer diameter portion of the workpiece or the inner diameter portion thereof.

SUMMARY OF THE INVENTION

It is therefore an object of the present invention to provide a hand apparatus of a robot which is less likely to be damaged by the shock loads imposed thereon.

Another object of the present invention is to provide a hand apparatus of a robot which can offer a reliable and effective gripping of workpieces having different shapes.

In accordance with an aspect of the present invention, there is provided a hand apparatus of a robot, comprising: a wrist member; a main frame; damper coupling means for resiliently mounting said main frame to said wrist member; a pair of four-point-articulated link arms each pivotally mounted to said main frame; a pair of sub-frames each pivotally mounted to said respective link arms; a pair of finger means each pivotally mounted in every direction to said respective link arms; a pair of hydraulic cylinder means each including a cylinder and a piston rod and defining a head end chamber and a rod end chamber therein, said cylinder being pivotally connected to said main frame and said piston rod being pivotally connected to said respective link arms; and means for selectively supplying pressurized fluid to said head end and rod end chambers.

The above and other objects, features and advantages of the present invention will be readily apparent from the following description taken in conjunction with the accompanying drawings.

DESCRIPTION OF THE PREFERRED EMBODIMENTS

The present invention will now be described below by way of example only with reference to the accompanying drawings.

Figure 7:
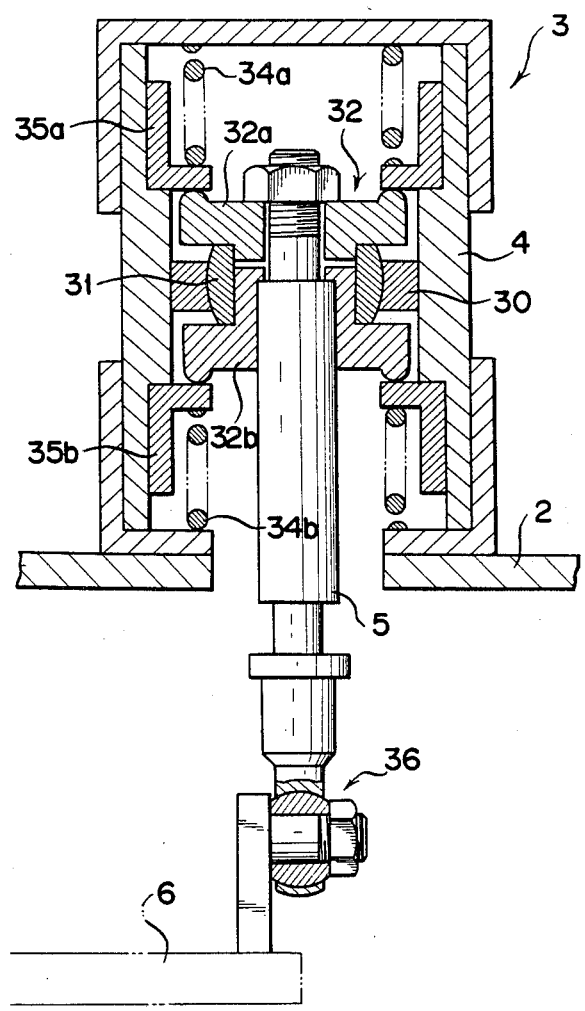
FIG. 7 is a longitudinal sectional view of a damper coupling employed in the present invention with no load being imposed on a rod.

In the drawings, reference numeral 1 denotes a rotatable wrist which has a base plate 2 fixedly secured to the leading end thereof. Fixedly secured to the base plate 2 are four or three casings 4 of damper couplings 3. Each of the damper couplings 3 is constructed as shown in FIG. 7 and is arranged such that a rod 5 is supported by the casing 4 in such a manner that the rod can be resiliently oscillated and is capable of extension and contraction. Each of the rods 5 of the damper couplings 3 supports a main frame 6. The operation of the damper couplings 3 will be described hereinbelow.

The main frame 6 is provided, at its symmetrical positions relative to the axis of the wrist 1 with a pair of four-point-articulated link arms 9 and 10 each being comprised of a first arm 7 and a second arm 8. Connected to the leading ends of both four-point-articulated link arms 9 and 10 are sub-frames 11 and 12, respectively. Connected to the first arms 7, 7 of the four-point-articulated link arms 9, 10 are leading ends of rods 13a, 13a of hydraulic cylinder means 13, 13 which are pivotally connected to the main frame 6. The arrangement is made such that simultaneous extension and contraction of the cylinder means 13, 13 enables each of the four-point-articulated link arm 9 and 10 to turn towards and away from each other relative to the axis of the wrist 1 thereby moving the sub-frames 11 and 12 towards and away from each other.

Figure 1:
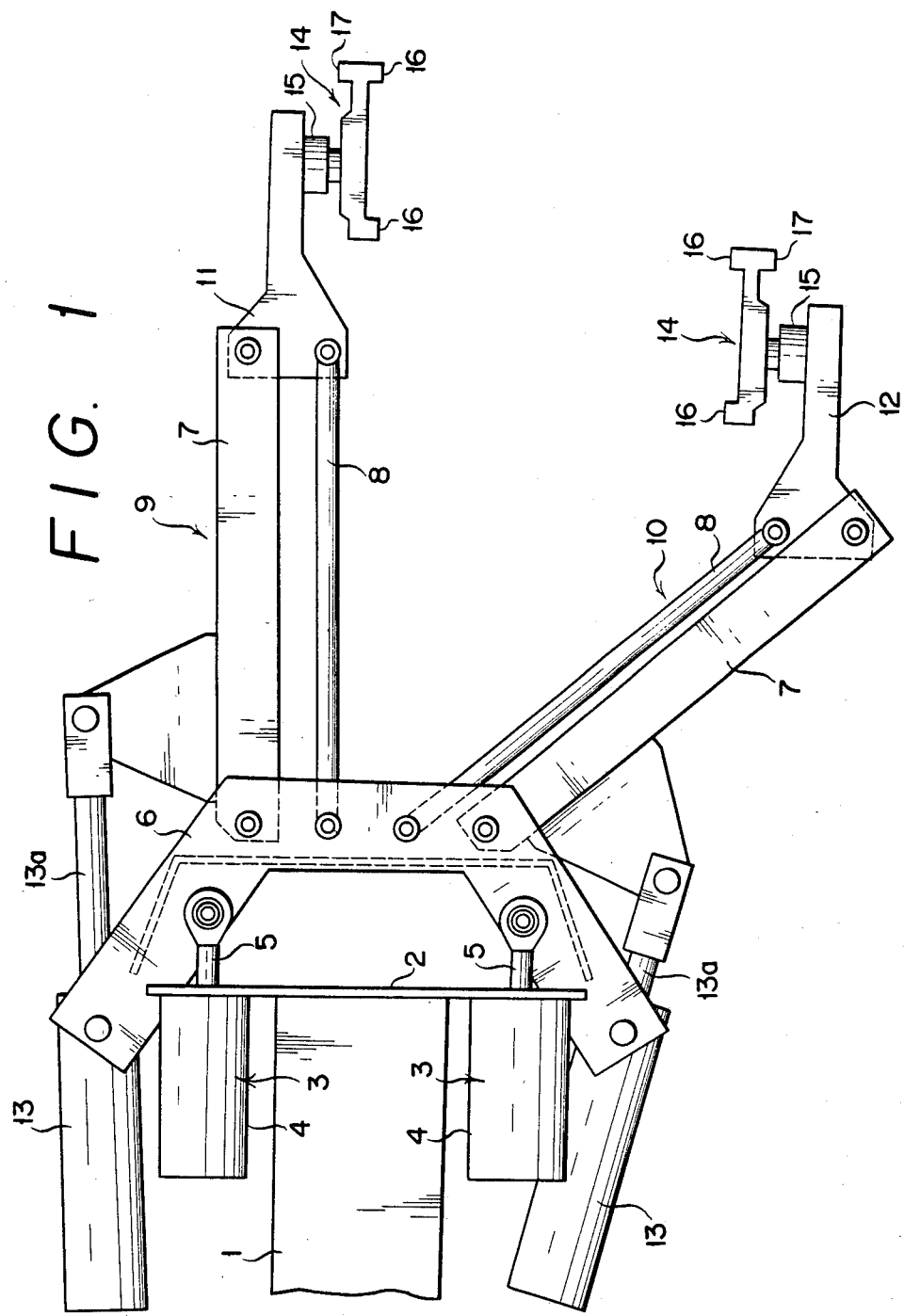
FIG. 1 is a side elevational view of a hand apparatus according to the present invention.
Figure 2:
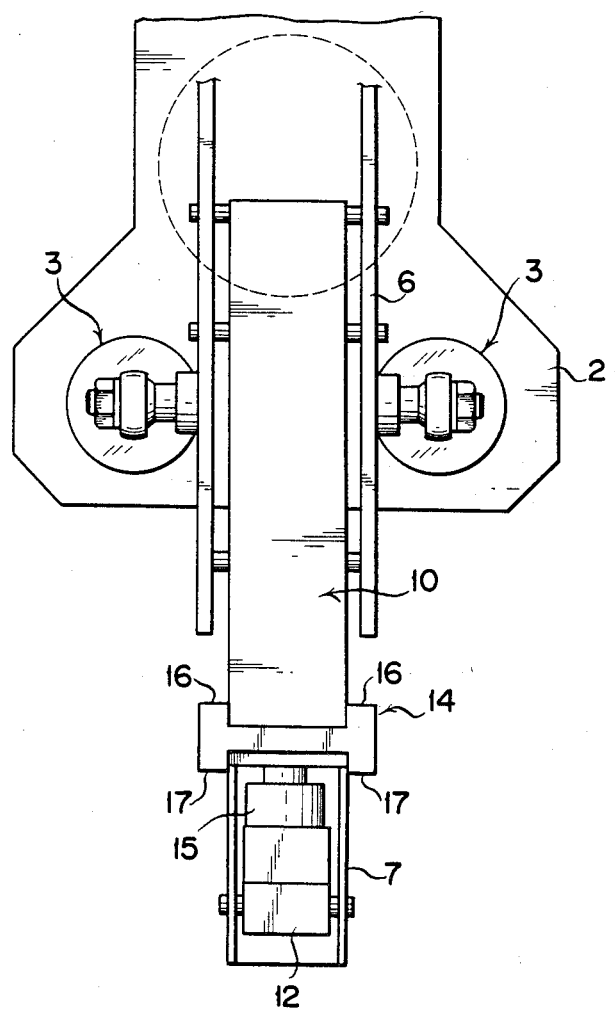
FIG. 2 is a front elevational view, partly broken away, of the hand apparatus of FIG. 1.
Figure 3:
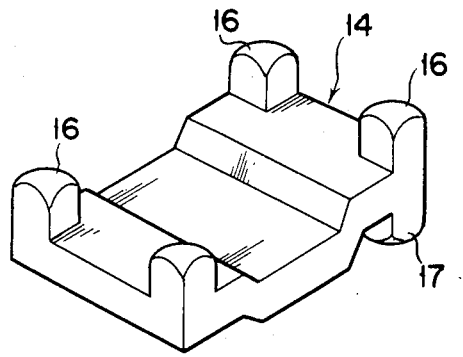
FIG. 3 is a perspective view of a finger means of the present invention.

The respective opposite surfaces of the sub-frames 11 and 12 have fingers 14, 14 connected through spherical joints 15, 15. Each of the fingers 14, 14 is of the shape as shown in FIG. 3 and has four projections 16, each having a spherical end face, formed at four corners of the front surface of a generally flat-shaped body and similar two projections 17 formed at two corners on one side of the rear surface of the body. These fingers 14, 14 are located to oppose the projections 16 formed on the front surfaces, and the rear sides of the fingers 14, 14 with projections 17 are connected to the sub-frames 11 and 12, respectively. Further, located between the sub-frames 11 and 12 and the fingers 14 and 14, respectively, is a stopper not shown adapted to prevent the rotation of the finger 14 beyond a predetermined angle.

Figure 4:
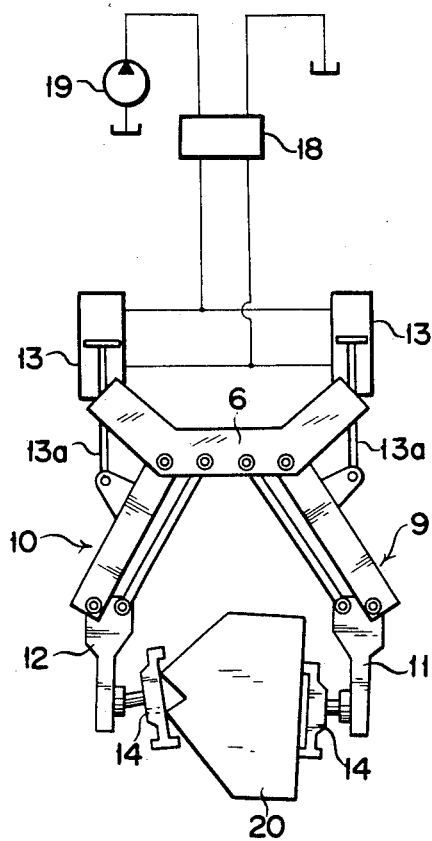
FIG. 4 is a schematic representation of a hand apparatus showing hydraulic connection of cylinders and showing how a workpiece being gripped from outside.

Conduits of hydraulic cylinder means 13, 13 for turning the four-point-articulated link arms 9 and 10 are arranged such that, as shown in FIG. 4, rod end chambers of the cylinder means 13, 13 are interconnected, whilst head end chambers thereof are also interconnected, and their respective connection circuits are connected through a change-over valve 18 with a pressurized fluid supply source such as an oil hydraulic supply.

In the above-mentioned arrangement, if the change-over valve 18 is switched over to supply pressurized fluid into the head end chambers of both the hydraulic cylinder means 13, 13, then the pair of four-point-articulated link arms 9 and 10 will turn towards each other so that the fingers 14 and 14 may clamp the workpiece 20 from the outside thereof (Refer to FIG. 4). In this case, even if the workpiece has any indefinite shape, each of the fingers 14, 14 can turn along the surfaces of the workpiece 20 to be clamped thereby clamping it under a stable condition.

Figure 5:
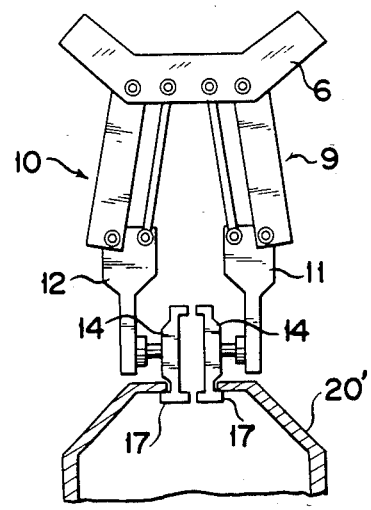
FIG. 5 is similar to FIG. 4 but showing how a workpiece being gripped by finger means from inside.
Figure 6:
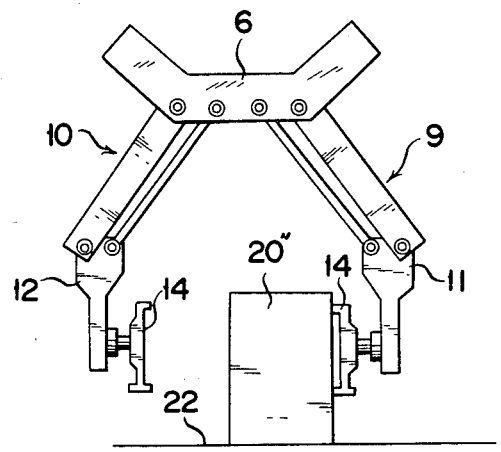
FIG. 6 is similar to FIG. 4 but showing how a workpiece placed on a bed offset from the longitudinal center line of the hand apparatus being gripped.

Whilst, if the change-over valve 18 is switched over to supply pressurized fluid into the rod end chambers of both the hydraulic cylinder means 13 and 13, then the fingers 14, 14 will move away from each other so that the projections 17, 17 on the rear faces of the fingers 14, 14 may engage with and clamp the inner diameter portion of a workpiece 20' (Refer to FIG. 5).

Further, in case of clamping a workpiece 20" which rests on an oscillating bed 22 and whose axis offsets from that of the wrist 1, one of the fingers 14, 14 first abuts against the workpiece 20" and then stops, whilst the other finger 14 moves towards and clamps the workpiece 20" while it remains offset. Therefore, unreasonable or excessive force is not applied to the whole hand means. This is also true in the case where the hand means strikes against the workpiece bed. In such a case, the shock load can be absorbed by the fluid under pressure in the hydraulic cylinder means 13, 13.

Figure 8:
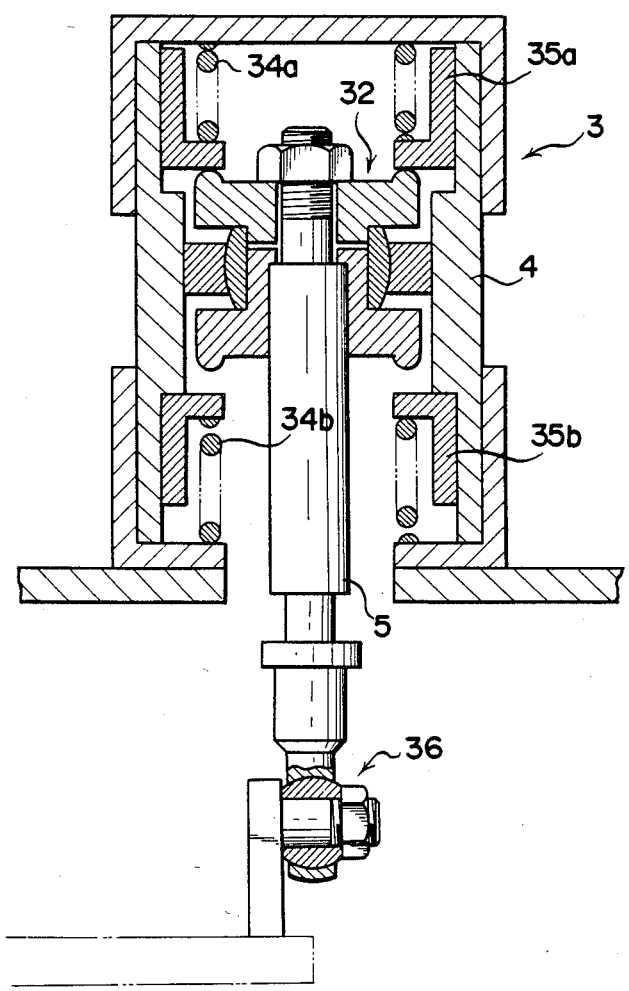
FIG. 8 is similar to FIG. 7 but showing an axial shock load being imposed on the rod.
Figure 9:
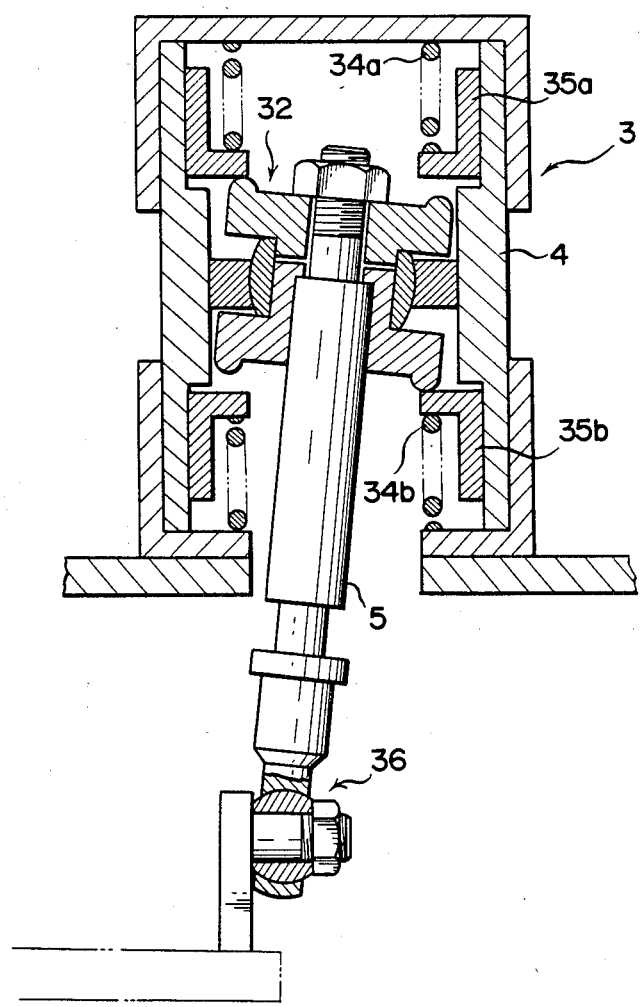
FIG. 9 is similar to FIG. 7 but showing a lateral shock load being imposed on the rod.

Referring to FIGS. 7 to 9, the damper couplings 3 will now be described in detail below. The damper couplings 3 comprises a cylindrical member 4 fixedly secured to the base plate 2, an internally concave spherical bush 30 which is axially slidably mounted within the cylindrical member 4, a partly spherical member 31 carried by the bush 30, a holder member 32 adapted to hold the partly spherical member 31 and having flanges 32a and 32b located on both sides of the partly spherical member 31, the holder member 32 being fixedly secured to the base end of the rod 5, and collars 35a and 35b biased by springs 34a and 34b, respectively, which sandwich axially the holder members 32a and 32b. The leading end of the rod 5 is connected through a spherical joint 36 to the main frame 6.

When a shock load is applied to the main frame 6 connected by the damper couplings 3 of the above-mentioned construction in the axial direction of the wrist 1, the spring 34a will flex to move the holder member 32 so that the shock load may be absorbed by the spring 34a (FIG. 8).

When a shock load is exerted to the main frame 6 in a direction to quake it transversely, the holder member 32 will turn together with the rod 5 against the biasing force of the springs 34a and 34b so that the transversely exerted shock load may be absorbed (FIG. 9).

Further, when a twisting force is exerted to the main frame 6, a transverse load is exerted on each of the damper couplings 3 so that their respective holder members 32 may turn together with their respective rods 5 against the forces of the springs 34a and 34b thereby absorbing the shock load.

Figure 10:
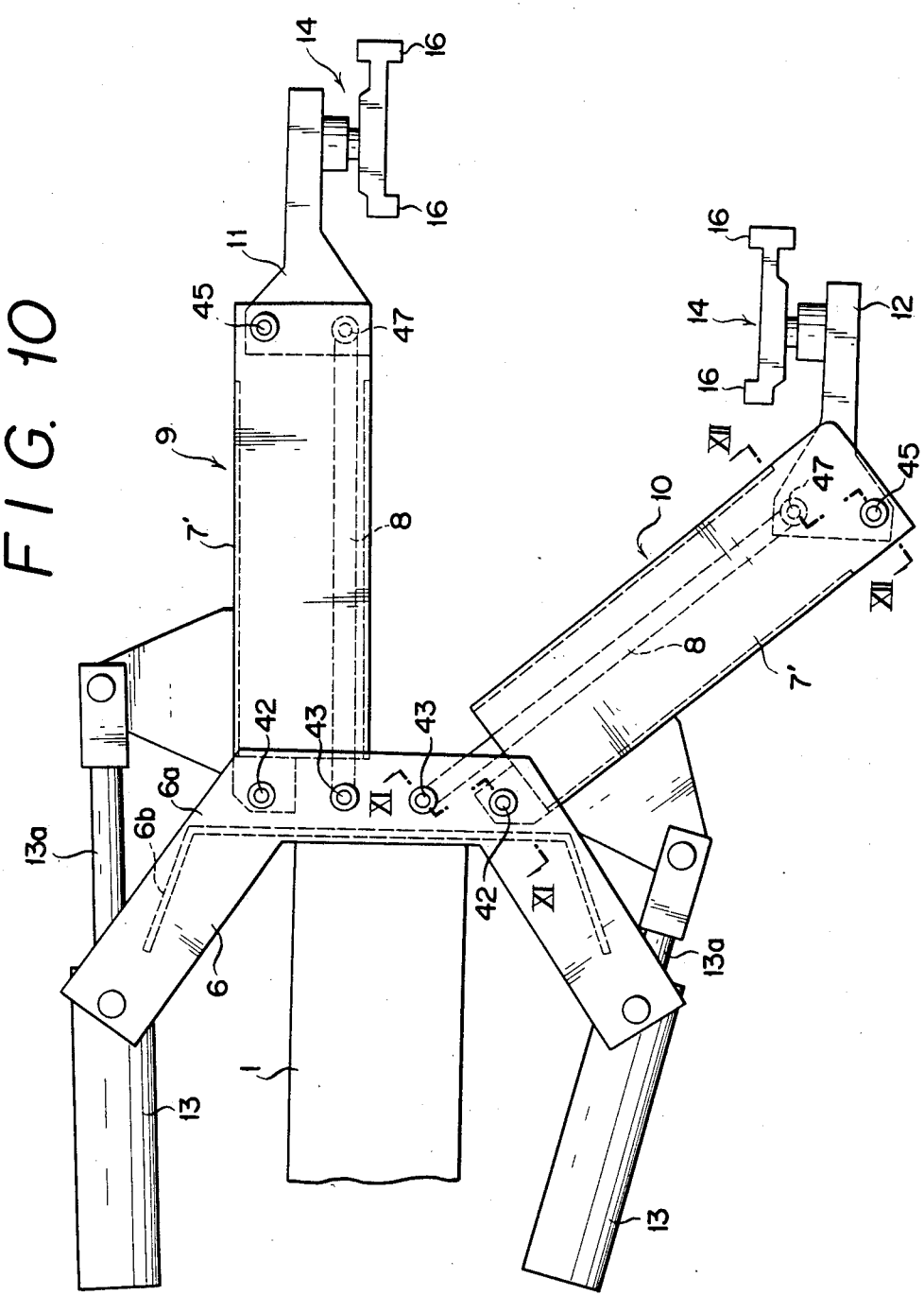
FIG. 10 is similar to FIG. 1 but showing another embodiment of the present invention.

Referring to FIG. 10 in which another embodiment of the present invention is shown, reference numeral 6 denotes a main frame fixedly secured to a wrist 1, the main frame 6 being comprised of two pieces of plates 6a and 6a, forming a york, which are connected by a rib 6b connected to the wrist 1. The main frame 6 is provided, at its symmetrical positions relative to the axis of the wrist 1, with a pair of four-point-articulated link arms 9 and 10 each consisting of a first arm 7' and a second arm 8, said link arms 9 and 10 being capable of turning towards and away from each other and having subframes 11 and 12 connected to the leading ends of the link arms 9 and 10, respectively.

Out of the first and second arms 7' and 8 constituting the four-point-articulated link arms 11 and 12, respectively, the first arms 7' located outside mainly give required strength to the four-point-articulated link mechanism, said first arms 7' having connected thereto hydraulic cylinder means 13, 13 for turning the four-point-articulated link arms 11 and 12. Each of the first arm 7' is formed by a square-shaped pipe and accommodates the second arm 8 in it.

Figure 11:
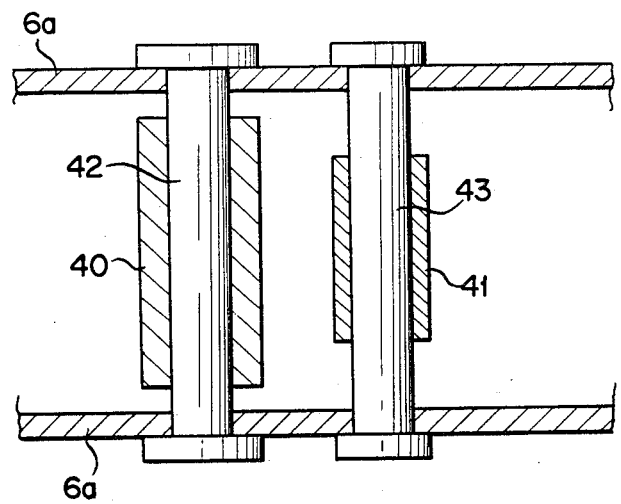
FIG. 11 is a sectional view taken along the line XI—XI of FIG. 10.
Figure 12:
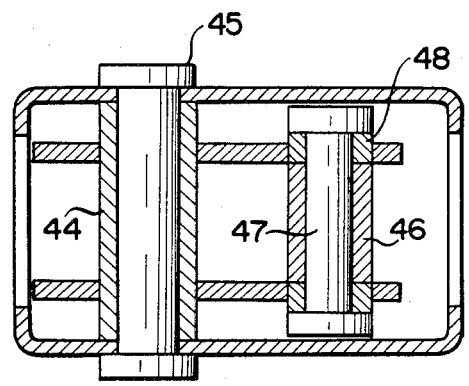
FIG. 12 is a sectional view taken along the line XII—XII of FIG. 10.
Figure 13:
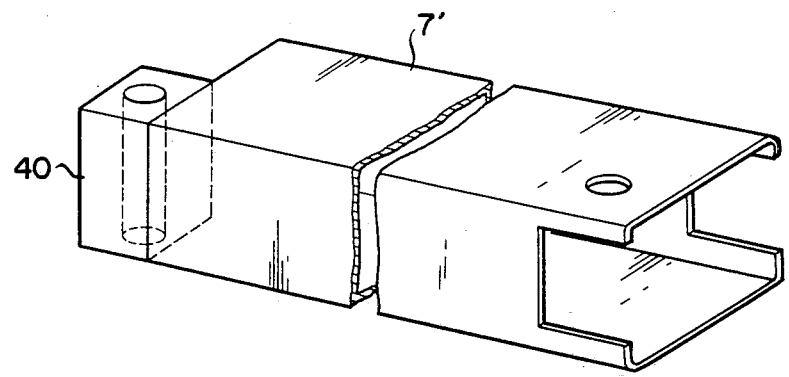
FIG. 13 is a perspective view of a first arm.
Figure 14:
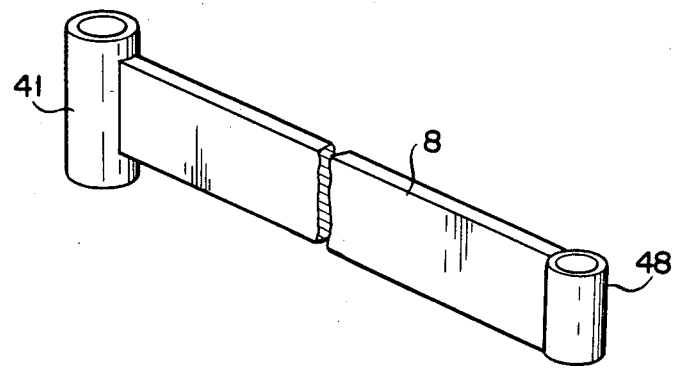
FIG. 14 is a perspective view of a second arm.

The base ends of the first arms 7' and second arms 8 have, as shown in FIG. 11, respective bosses 40 and 41 which are fixedly secured thereto and which are connected to pins 42 and 43 fitted to the main frame 6. Whilst, the leading ends of the first and second arms 7' and 8 have, as shown in FIG. 12, a boss 44 for fitting the sub-frames 11 and 12 which is connected by a pin 45 to the first arm 7', and another boss 48 connected by a pin 47 to a boss 46 serving as fulcrum of the sub-frames 11 and 12.

The above-mentioned hydraulic cylinder means 13, 13 are carried by the main frame 6. Further, fingers 14, 14 are connected to the sub-frames 11 and 12, respectively, in such a manner that the fingers can be oscillated freely. Moreover, the main frame 6 may be connected, as occasion demands, through the damper couplings 3 to the wrist 1 as shown in the first embodiment.

In the above-mentioned arrangement, by extending and contracting the hydraulic cylinder means 13 and 13, the four-point-articulated link arms 9 and 10 can be moved from a closed position shown in the upper side of FIG. 10 to an open position shown in the lower side of the same drawing and vice versa. At that time, the sub-frames 11 and 12 will be moved in parallel. Further, each of the second arms 8 of the four-point-articulated link arms 9 and 10 is accommodated in the first arm 7' so as to be protected from outer obstacles. Since the present invention is constructed as mentioned in detail hereinabove, even in the case where the hand means strikes against the workpiece bed by mistake, there is no possibility of damaging the components forming the hand means and the actuators for turning the wrist etc., and also workpieces of various shapes resting on workpiece bed can be clamped without fail.

Further, according to the second embodiment of the present invention, the strength of the four-point-articulated link arms 9 and 10 against the shock load imposed externally can be improved, and in particular, the second arms 8 having a comparatively low strength can be prevented from failure. Further, according to the second embodiment of the present invention, the external appearance of the four-point-articulated link arms 9 and 10 is of a single hollow pipe and can be made neat.

It is to be understood that the foregoing description is merely illustrative of preferred embodiments of the present invention and that the present invention is not to be limited thereto, but is to be determined by the scope of the appended claims.

What is claimed is:

1. A hand apparatus of a robot, comprising:
   a wrist;
   a main frame;
   damper coupling means resiliently mounting said main frame on said wrist member;
   a pair of four-point-articulated link arms each pivotally mounted on said main frame;

a pair of sub-frames each pivotally mounted on said respective link arms;

a pair of finger means each pivotally mounted for movement in every direction on said respective link arms;

a pair of hydraulic cylinder means each including a cylinder and a piston rod and defining a head end chamber and a rod end chamber therein, said cylinder being pivotally connected to said main frame and said piston rod being pivotally connected to said respective link arms; and means for selectively supplying pressurized fluid to said head end and to said rod end chambers;

said damper coupling means comprises:

a plurality of damper couplings each comprising a cylindrical member having end walls fixedly secured on said wrist member, an internally concave spherical bushing slidable mounted within said cylindrical member, a partly spherical ring member rotatably received within said internally concave spherical bushing, a holder member mounted in said spherical ring member, said holder member having two flanges sandwiching said spherical ring member therebetween, a first and a second spring each mounted between one of the flanges and one of the end walls of said cylindrical member, and a rod inserted in said holder member, said rod having one end coupled to said holder member and the other end pivotally coupled to said main frame.

2. A hand apparatus of a robot as recited in claim 1 wherein said head end chambers of said cylinder means are interconnected with each other and said rod end chambers are interconnected with each other and wherein said means for selectively supplying pressurized fluid comprises a source of pressurized fluid and a control valve.

3. A hand apparatus of a robot as recited in claim 1 wherein each of said finger means has a plurality of protrusions formed thereon for facilitating the gripping of a workpiece.

4. A hand apparatus of a robot as recited in claim 1 wherein each of said four-pointed-articulated link arms comprises first and second arms each pivotally connected to said main and sub-frames and extending parallel to each other.

* * * * *